United States Patent
Haas et al.

(10) Patent No.: US 7,426,065 B2
(45) Date of Patent: Sep. 16, 2008

(54) SYSTEM AND METHOD FOR ALTERNATING BETWEEN TRANSMITTING AND REDUCING INCIDENT LIGHT ON PIXEL PORTION OF AN IMAGER

(75) Inventors: William Robert Haas, Fort Collins, CO (US); Kirk Steven Tecu, Longmont, CO (US); Dave W. Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 10/649,911

(22) Filed: Aug. 26, 2003

(65) Prior Publication Data

US 2005/0046716 A1 Mar. 3, 2005

(51) Int. Cl.
*H04N 1/46* (2006.01)
(52) U.S. Cl. .................. 358/505; 358/474; 358/487; 358/494; 358/496; 399/151; 382/318; 250/208.1; 348/272; 348/382; 348/224.1; 348/270; 348/273
(58) Field of Classification Search .......... 348/345, 348/272, 275, 280, 362, 363, 367, 224.1, 348/270, 273, 290, 342, 743, 786; 358/505, 358/506, 487, 494, 496; 382/318; 250/208.1
See application file for complete search history.

(56) References Cited

U.S. PATENT DOCUMENTS

| | | | |
|---|---|---|---|
| 4,516,032 A * | 5/1985 | Barr | 250/208.1 |
| 6,005,990 A | 12/1999 | Barrett et al. | |
| 6,256,066 B1 * | 7/2001 | Yukawa et al. | 348/340 |
| 6,414,760 B1 | 7/2002 | Lopez et al. | |
| 6,958,777 B1 * | 10/2005 | Pine | 348/362 |
| 2002/0121652 A1 * | 9/2002 | Yamasaki | 257/222 |
| 2003/0011700 A1 * | 1/2003 | Bean et al. | 348/345 |

FOREIGN PATENT DOCUMENTS

JP 08289080 A 11/1996

OTHER PUBLICATIONS

Michael Elad and Arie Feur, Restoration of a Single Superresolution Image from Several Blurred, Noisy, and Undersampled Measured Images, Dec. 1997, IEEE Transactions on Image processing, vol. 6, No. 12, p. 1646-1658.
Norio Takato, Takashi Kurokawa, and Yuzo Katayama, Tapered Fiber-Optic Sheet Formation and Its Image-Guiding Properties, Apr. 15, 1981/vol. 20, No. 8/Applied Optics, p. 1397-1402.
K. Douglas Gennetten and Michael J. Steinle, Designing a Scanner with Color Vision, Aug. 1993, pp. 1 of 6.
Christopher D. Watkins, Alberto Sadun and Stephen Marenka, Modern Image Processing: Warping, Morphing, and Classical Techniques, 1993 Academic Press, Inc., p. 99-102.

\* cited by examiner

*Primary Examiner*—David Ometz
*Assistant Examiner*—Usman Khan (57) ABSTRACT

An imager apparatus comprises a pixel and a first filter positioned in an incident light path for a portion of the pixel, the filter being operable to alternate between transmitting and reducing incident light on the pixel portion.

5 Claims, 6 Drawing Sheets

SYSTEM AND METHOD FOR ALTERNATING BETWEEN TRANSMITTING AND REDUCING INCIDENT LIGHT ON PIXEL PORTION OF AN IMAGER

BACKGROUND

Description of the Related Art

A variety of consumer and scientific devices use digital imaging and post-processing to capture and record still and moving images. Flatbed scanners, copy machines, digital cameras, and the Hubbell space telescope all use an imager having pixels sensitive to electromagnetic radiation (ER) to capture an image of an object. Both CCD (charge-coupled device) and CMOS (complementary-metal oxide semiconductor) imagers have pixels arranged in either a one or two-dimensional array, combined with light-guiding optics. The spatial resolution of an array of pixels in an imager refers to the array's ability to resolve dimensions on a document to be imaged. The resolution can be defined as the number of resolvable image units (RIUs) discernable on the imaged object. The spatial resolution of the imager may be limited by the quality of the mirrors and lens but is fixed because of their fixed relative positions in the illustrated system.

Spatial resolution is of particular concern to imager designers, as is cost and light sensitivity, all of which are affected by pixel size. The resolution of imagers, such as scanners, is fixed, in part, by the size of the pixels. If pixel dimensions are halved to allow twice as many pixels in the imager, the spatial resolution of the system could be increased proportionally. Advances in semiconductor processing have allowed manufacturers to reduce pixel sizes to allow more pixels per unit area in an imager. Unfortunately, while reducing pixel size allows improved spatial resolution, the improvement is at the expense of reduced signal-to-noise ratios (SNR). The reduction also reduces light sensitivity and increases susceptibility to pixel blooming caused by improper shuttering.

Effective shuttering mitigates some of the susceptibility to blooming caused by reduced pixel size. Such shuttering may be accomplished either electronically, by varying the frequency of pixel readout and reset (in the case of a CMOS imager), or mechanically, by controlling the amount of light that reaches the imager. Unfortunately, while use of the shutter helps to resolve blooming issues, it does not help to reduce other problems resulting from smaller pixel size, such as a reduced SNR.

One approach to obtaining better spatial resolution without sacrificing an imager's SNR is to increase pixel size. This approach, however, increases system size and cost. Another approach is to map multiple points on an object to the same pixel and perform multiple scans to capture the points for later recombination by a processor into a complete image. Separate scans are performed and the images recombined to form the complete image. Unfortunately, such solutions tend to increase manufacturing cost and system complexity.

A need continues to exist to improve spatial resolution without increasing system cost, pixel count or reducing pixel size.

SUMMARY

An imager system and method has, in one embodiment, a pixel and a first filter positioned in an incident light path for a portion of the pixel, the filter being operable to alternate between transmitting and reducing incident light on the pixel portion.

In one embodiment, a method is described as directing light from different locations of an object to different portions of the pixel, alternately transmitting and at least partially blocking the light for the different pixel portions in sequence, and reading out the pixel at different times corresponding to the transmission of the light to the different pixel locations.

BRIEF DESCRIPTION OF THE DRAWINGS

The components in the figures are not necessarily to scale, emphasis instead being placed upon illustrating the principals of the invention. Moreover, in the figures like reference numerals designate corresponding parts throughout the different views.

DETAILED DESCRIPTION

An imager, in accordance with an embodiment of the invention, has an array of ER-sensitive pixels with a plurality of radiation reducing mechanisms ("filters") associated with portions of each pixel. Although the embodiments are described in terms of ER in the visible spectrum, the wavelength of ER used would depend on the sensitivity of the imager to that wavelength and the ability of the filters to reduce the ER on the pixels. Consequently, the term "light" means any ER that the array of pixels is sensitive to. The filters are positioned between the pixels and the object to be imaged. Preferably, the filters are positioned either immediately adjacent the pixels or immediately adjacent the object to be imaged. Because the area of each pixel corresponds to a specific area on the imaged object, the ability of a processor to distinguish between points on the imaged object is increased by sequentially actuating the filters over each pixel in a plurality of scans which are combined into a single image. In effect, the sequential activation and plurality of scans increases the number of pixels in the array without translating the pixels relative to the imaged object between scans. Embodiments of the invention can be expanded to greater spatial resolutions by increasing the number of filters associated with each pixel, and is limited only in the ability to fabricate progressively smaller filters and to distinguish between progressively smaller levels of illumination on each pixel.

Figure 1:
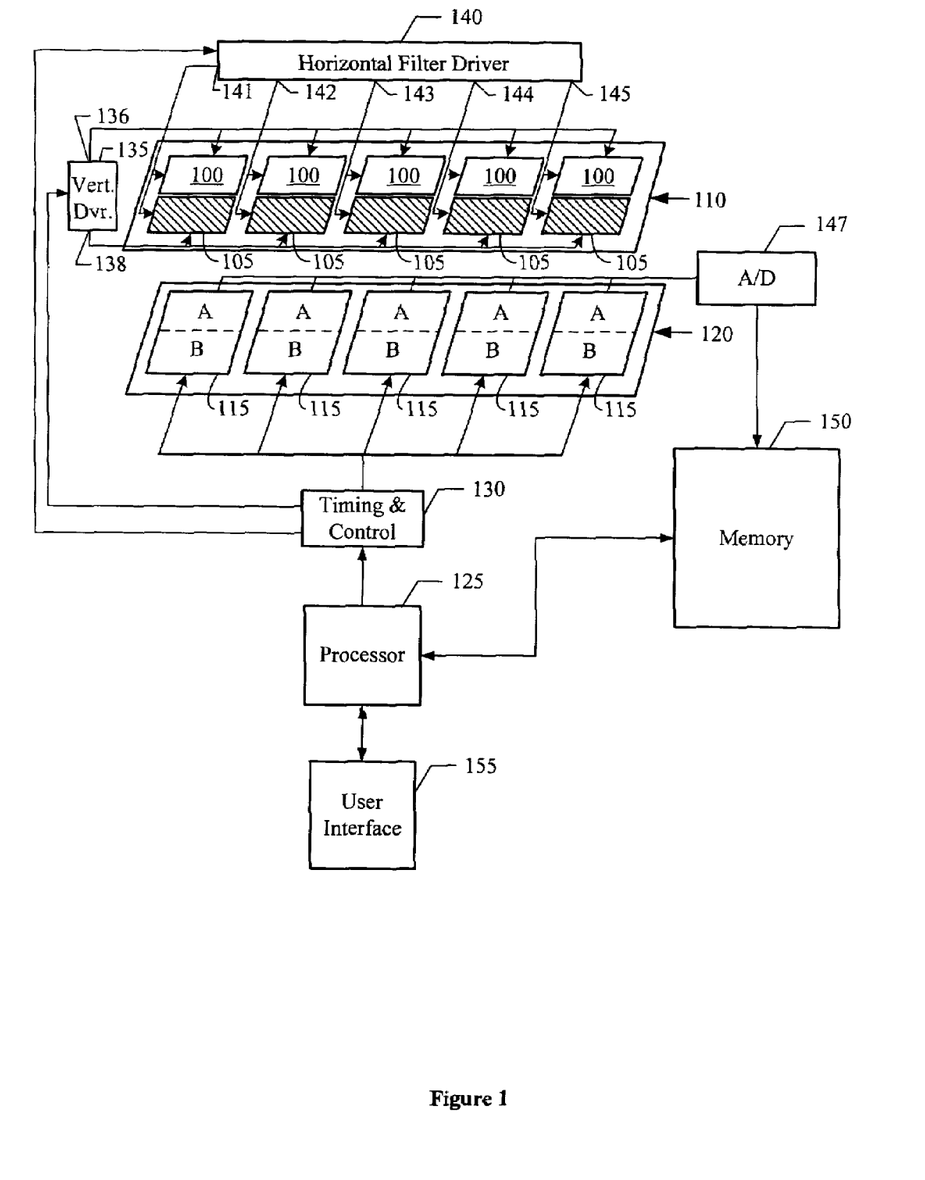
FIG. 1 is a block diagram illustrating an embodiment that has a filter array positioned immediately above an array of pixels, with both arrays controlled by a processor.

FIG. 1 illustrates first and second filters (100, 105) in a filter array 110 positioned above individual pixels 115 in a pixel array 120 with both arrays (110, 120) in communication with a processor 125. The processor 125 is coupled to a timing and control section 130 which provides coordinated-control signals to both the pixel array 120 for pixel readout and to vertical and horizontal filter drivers (135, 140) for filter array 110 actuation. The vertical filter driver has first and second vertical outputs (136, 138) coupled to each of the first and second filters (100, 105), respectively. The horizontal driver has first through fifth horizontal outputs (141, 142, 143, 144, 145) each coupled to a separate first and second filter (100, 105). A particular filter is actuated when it receives both a vertical and horizontal actuation signal, either positive or negative voltage, from the two drivers (135, 140). Each of the pixels 115 provides readout data when they receive a readout control signal from the timing & control section 130.

The readout data is communicated to an analog-to-digital (A/D) converter 147 which converts the analog signals to digital data to be saved in a memory 150. The memory 150 is preferably a flash memory, but may include RAM (random-access memory) or ROM (read-only memory) to accomplish a temporary buffering or permanent storage of readout data. The memory 150 is in communication with the processor 125 for image processing and/or retrieval. A user interface 155 communicates with the processor 125 to provide a user with access to status information such as "power on" and "ready." The user interface 155 can include a visual display or audio output.

The pixel array 120 is responsive to incident light to provide readout data and can be, for example, a CCD imager or a CMOS imager having a one or two-dimensional array of pixels. The processor 125 can be a general-purpose digital signal processor (DSP) or an application specific processor (ASIC). If the pixel array 120 is a CMOS imager, the processor 125 may be integrated with the pixel array 120 on a single substrate that includes the necessary pixels 115 and timing and control element 130. In the embodiment illustrated in FIG. 1, the filter array 110 is positioned immediately above the pixel array 120 to reduce stray light introduced between the two. The A/D converter 147 can be a sigma-delta or dual slope converter to convert the analog output of the pixel array 110 to a digital form for storage in the memory 150. If the pixel array 110 is a CMOS imager, the A/D converter 145 could be integrated on a common chip with the array 110 and processor 125. Although the various components are illustrated with electrically conductive paths between them, other signal transport mechanisms, such as an optical bus, may also be used.

First and second filters (100, 105) are preferably formed from FLC panes that become opaque to light upon the application of a positive voltage from both the vertical and horizontal filter drivers (135, 140), and translucent upon the application of a negative voltage by each (135, 140). Alternatively, the filters (100, 105) can be constructed such that voltages of an opposite polarity induce the opaque and translucent states. In either case, for FLC panes, the filter remains opaque or translucent after the voltage is removed, and does not change until an opposite polarity voltage is applied. In FIG. 1, the timing and control section 130 induces the vertical driver 135 to drive its second vertical output 138 with a positive voltage and the first through fifth horizontal outputs (141-145) of the horizontal filter driver 140 to also drive a positive voltage to actuate all of the second filters 105 to their respective opaque states. If the first filters 100 are not already in their translucent states, the horizontal and vertical filter drivers (140, 135) are induced to drive the first filters 100 with a negative voltage.

Pixel portion B receives substantially reduced incident light, while portion A receives substantially the entire incident light from the translucent first filters 100. The timing and control section 130 induces a first pixel readout when the second filters 105 are opaque and the first filters 100 translucent. A second pixel readout is induced when the states of the first and second filters (100, 105) are reversed, so that the processor 125 can distinguish between the spatial coordinates of an object corresponding to the two sets of filters. In effect, the number of pixels is doubled, with each filter corresponding to a separate pixel.

In one embodiment, the first and second filters (100, 105) are not opaque when a positive voltage is applied, but rather semi-opaque to filter light incident on portions A and B of the pixels 115. With the predetermined filter opacity known, luminance values would be obtained for the two spatial coordinates of the projected image while maintaining better light sensitivity than the embodiment described for the opaque filter states. Also, in a two dimensional implementation, the filter array would provide filter coverage for each A and B portion of each pixel in the array. Various techniques can be used to address and control the filters, such as addressing each individual filter in sequence, addressing all of the A filters at one time and all of the B filters at another time, or grouping the filters by rows, columns or other geometries for addressing.

Figure 2:
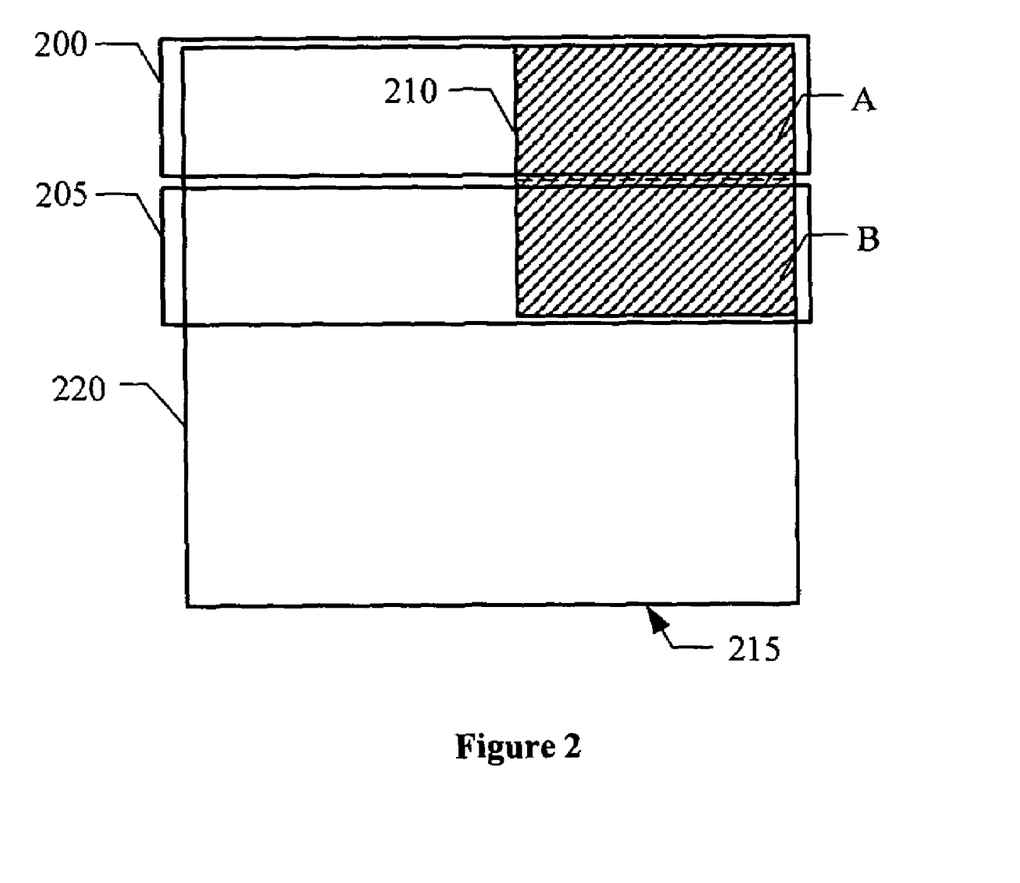
FIG. 2 is a block diagram illustrating an embodiment with first and second filters over the light-sensitive portion of a pixel in a CMOS imager.

In a CMOS imager implementation, the first and second filters (100, 105) can be positioned above the entire pixel 115, or above the photosensitive portions of the pixel. FIG. 2 illustrates first and second active-area filters (200, 205) positioned substantially over only the photosensitive portion 210 of a pixel manufactured in CMOS ("CMOS pixel 215"). The non-photosensitive portion 220 would contain control circuitry that does not respond significantly to incident light and would not require filtering. For example, in a CMOS imager with a 14% fill-factor (14% of the total pixel area configured to be the photosensitive portion 210), the first and second active-area filters (200, 205) would each cover at least 7% each of the total pixel area and be positioned directly above the photosensitive portion 210 of the CMOS pixel 215. The first and second filters (200, 205) can also be implemented as an array micro-electromechanical elements, filters or shutters that are actuated to block or admit incident light onto the pixel portions A and B.

Figure 3A:
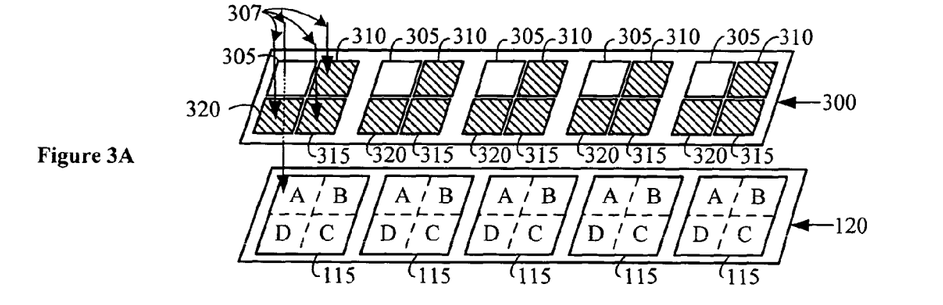
FIGS. 3A-3D are perspective views of an embodiment with first through fourth filters positioned above each individual pixel in an array of pixels, with each of FIGS. 3A-3D representing different filtering and transparent states of the filters.
Figure 3B:
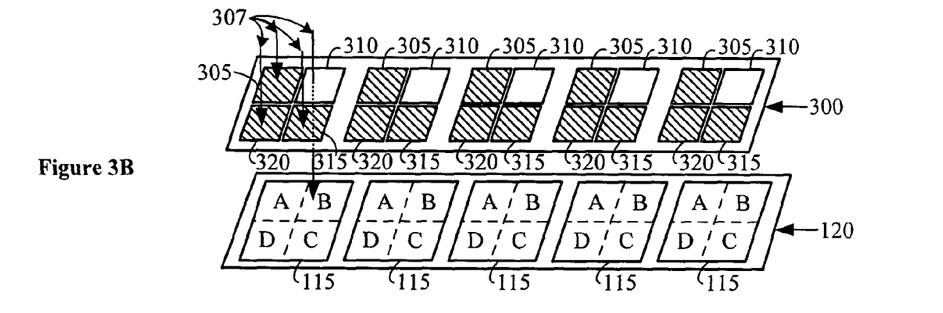
Figure 3C:
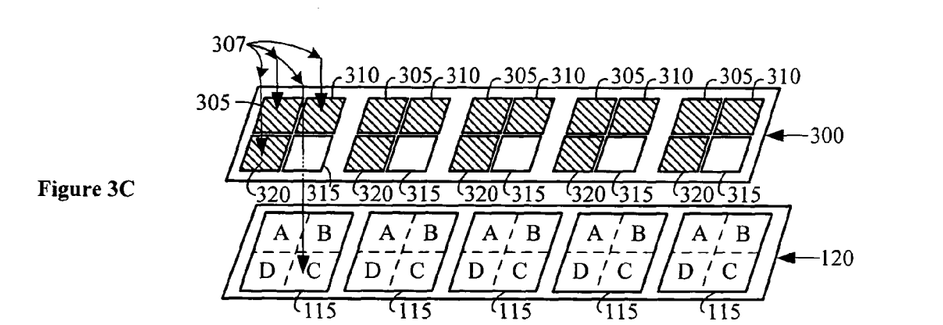
Figure 3D:
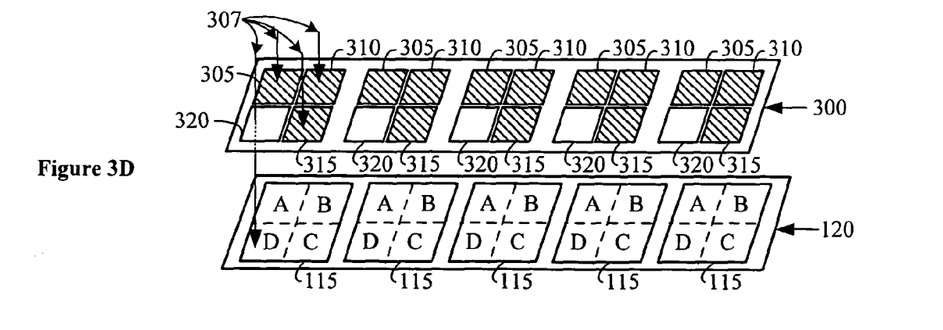

FIGS. 3A-3D each illustrate an embodiment that has a filter array 300 with four filters (305, 310, 315, 320) over portions A, B, C, D, respectively, of each pixel 115. Analogous to the two-filter implementation shown in FIG. 1, each of the four filters (305, 310, 315, 320) are actuated sequentially to correspond with respective sequential readouts of the pixels 115. FIG. 3A shows the first filter 305 in a transparent state to communicate incident light 307 to portion A of each pixel 115. The second, third and fourth filters are placed into an opaque state. The pixels 115 are read out, providing an indication of the amount of light 307 incident on portion A. FIG. 3B, 3C, or 3D illustrate the processor's 125 actuation of the other filters in the four-filter sets, which can be programmed to occur in any desired sequence. As with the two filter per pixel implementation, the filters can be addressed and actuated separately or in groups with an analogous vertical and horizontal driver set.

Figure 4:
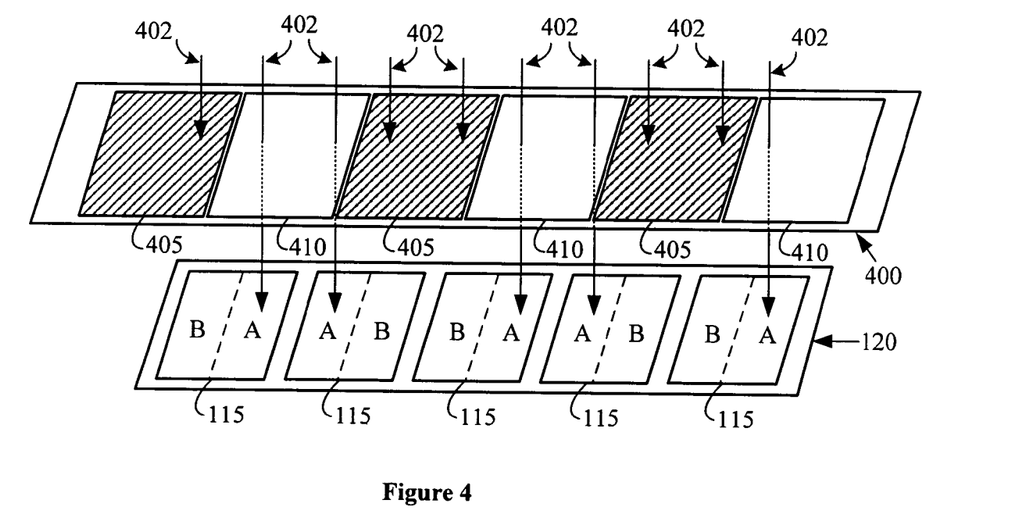
FIG. 4 is a perspective view of an embodiment with odd and even multiple-pixel filters, with odd-numbered filters in their filtering states and even-numbered filters in their transparent states.

FIG. 4 illustrates a perspective view of an embodiment with an array of multiple-pixel filters 400, with each filter positioned in the incident light path 402 for two adjacent pixels in an array of pixels 120. As illustrated, "odd" and "even" multiple-pixel filters (405, 410) are in the incident light paths for B and A portions, respectively, of the pixels 115. Thus, unlike the filters illustrated in FIGS. 3-5D, where each filter is associated with only one pixel, the multiple-pixel filter array 400 illustrated in FIG. 4 is configured for each filter to associate with equal halves of two pixels 115. Analogous to the two-filter implementation shown in FIG. 1, each of the illustrated odd and even multiple-pixel filters (405, 410) are placed sequentially in their filtering and transparent states during respective pixel readouts to provide an indication of the amount of light 402 incident on A and B portions. Embodiments of the invention can be expanded for a two-dimensional array, with a single filter covering a portion of multiple pixels to distinguish between the amount of incident light on each portion of each pixel.

Figure 5:
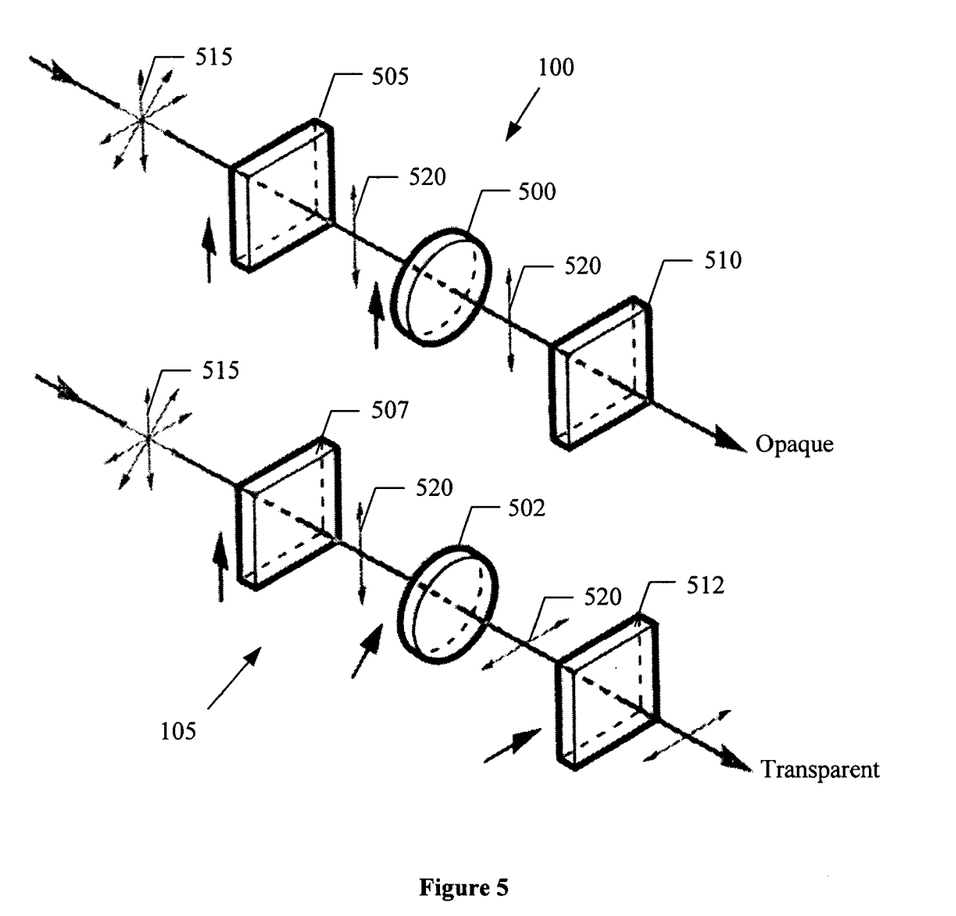
FIG. 5 is an exploded perspective view and ray schematic of an optical shutter, using a ferroelectric liquid crystal (FLC) cell, for use in the embodiments illustrated in FIGS. 3A through 4.

FIG. 5 illustrates an exploded perspective view of an implementation of first and second filters (100, 105) with the first filter 100 in its opaque state and the second 105 in its transparent state. Each filter (100, 105) includes respective thin FLC layers (500, 502) positioned between respective incoming (505, 507) and cross (510, 512) polarizers. Each of the cross polarizers (510, 512) are optically rotated by +90 degrees from the initial polarizers (505, 507). In their original state, the FLC layers (500, 502) have their optical axis rotated +45 degrees from the optical axis of their respective initial polarizers (505, 507).

In the first filter 100, the optical axis of the FLC layer 500 is rotated by +45 degrees upon application of a positive DC voltage to align the layer 500 with the optical axis of the initial polarizer 505. Non-polarized light 515 introduced to the initial polarizer 505 becomes vertically polarized and the FLC layer 500 does not change the orientation of the polarization axis of the transmitted light. Consequently, the first filter's 100 crossed polarizer 510 blocks the polarized light 520 and the filter is considered to be in its opaque state.

The second filter 105 is illustrated with the optical axis of its FLC layer 502 rotated by +45 degrees from its original +45 degree rotation upon application of a negative DC voltage, so that the layer 502 is aligned with the optical axis of its cross polarizer 512. Light polarized by the first polarizer 507 is rotated +90 degrees by the FLC 502 to allow the light to pass through the second polarizer 510.

Figure 6:
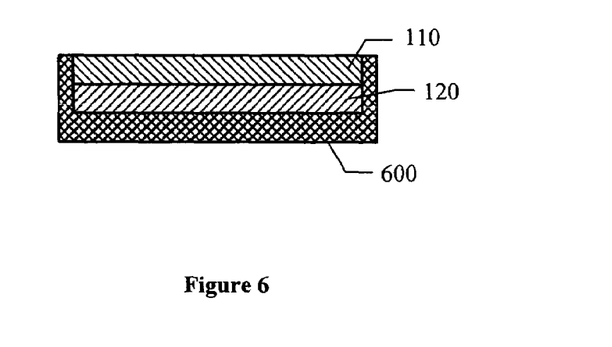
FIG. 6 is a cross section of an embodiment with a filter and pixel array seated in a packaging structure.

FIG. 6 illustrates an embodiment with the filter array positioned directly on the pixel array. The cross section illustrates the filter and pixel arrays (110, 120) seated in a rigid package 600 that could be formed from rigid plastic, metal, or composite molding to hold the arrays (110, 120) and protect them from damage.

Figure 7:
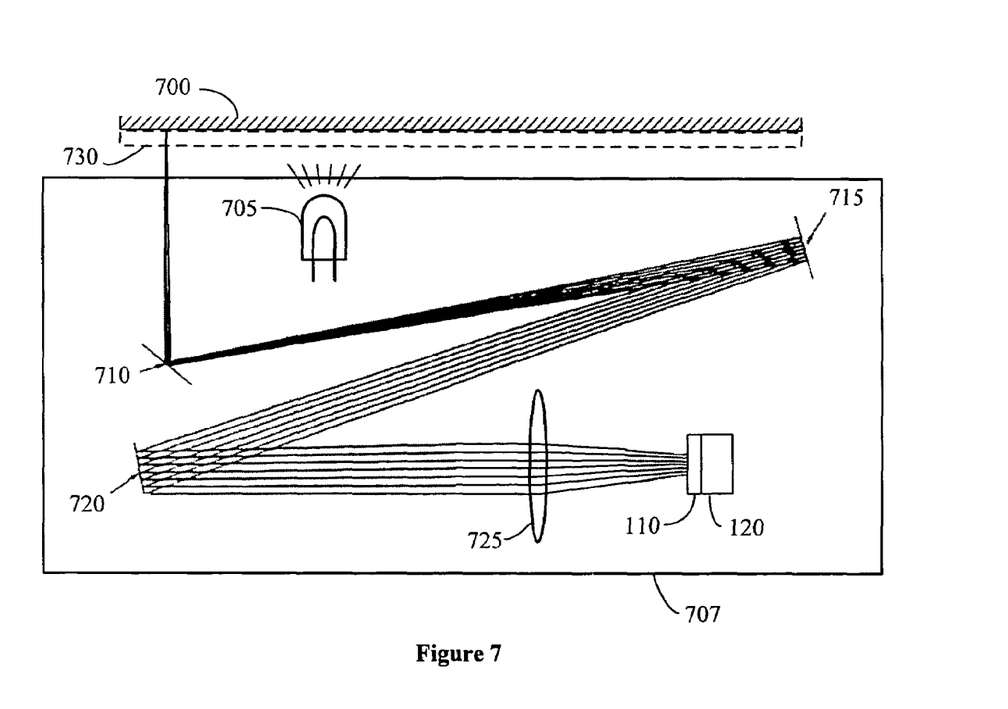
FIG. 7 is a block diagram and ray schematic of a document scanner that has a filter array positioned in front of the imager to enhance spatial resolution.

FIG. 7 illustrates an embodiment of the invention in a document scanner. An object 700 is illuminated with a light source 705, and the object's image is directed to scanner carriage 707 that has a light director 725 that, in one implementation, is a lens to focus the image onto the pixel array 120 through the filter array 110. Various light director schemes can be used to direct the image onto the pixel array, depending upon the physical arrangement of the system components. In the illustration of FIG. 7, three mirrors 710, 715 and 720 and a lens 725 are used in the scanner carriage 707. For CMOS and CCD imagers, the light source 705 can produce florescent or incandescent ER in the visible spectrum (380 through 780 nanometers). The lens 725 is a converging lens to reduce the image onto the filter and pixel arrays (110, 120). The lens 725 may include coatings to reduce the transmission of stray or reflected light to the pixel array 120. The carriage 707 is translated relative to the object 700 during multiple scans to capture an image of the entire object 700 in image post-processing.

Instead of positioning a filter array on the imager, a filter array 730 may be positioned immediately adjacent the object 700 to be imaged. Each pixel mapped onto the object (the scanner platen) would be associated with at least two adjacent filters on the filter array 730. The reflection of light 705 off the filter array 730 would be removed in image post-processing to leave only the light reflected from the non-filtered mapped spaces on the object 700. For example, a sample image would be taken to capture the reflection of light off of all filters in their opaque states. This sample image would then be subtracted from an object image in post-processing to complete a true image of the imaged object. Various filter sequencings can be used, as described above.

While various embodiments of the invention have been described, it will be apparent to those of ordinary skill in the art that many more embodiments and implementations are possible. For example, while an imager system has been described as including a light source to illuminate an object, the invention is also applicable to the imaging of object that emits its own radiation, as in infrared imaging.

What is claimed is:

1. Method for scanning an object, comprising:
   directing light from different points and locations of the object to different portions of a pixel in an array of pixels;
   alternately transmitting and at least partially blocking said light for said different pixel locations in sequence with a radiation reducing filter;
   reading out said pixel at different times corresponding to the transmission of said light to said different pixel portions;
   using a processor to distinguish between the points and the locations on the object; and
   sequentially actuating the radiation reducing filters over each pixel with a plurality of scans which are combined into a single image, wherein the sequential actuation and plurality of scans increases a number of pixels in the array of pixels without translating any of the pixels relative to the object between scans.

2. The method of claim 1, further comprising directing light from different respective locations of said object to different portions of each of said pixels, alternately transmitting and at least partially blocking said light for said different pixel portions in sequence, and reading out said pixels so that each pixel can distinguish between more than one spatial region on said image.

3. The method of claim 2, wherein said light is substantially fully blocked for said different pixel locations.

4. The method of claim 2, wherein said light is alternately transmitted and at least partially blocked for each of said pixels separately.

5. The method of claim 2, wherein said light is alternately transmitted and at least partially blocked for groups of said pixels concurrently.

* * * * *

UNITED STATES PATENT AND TRADEMARK OFFICE
CERTIFICATE OF CORRECTION

PATENT NO. : 7,426,065 B2  Page 1 of 1
APPLICATION NO. : 10/649911
DATED : September 16, 2008
INVENTOR(S) : William Robert Haas et al.

It is certified that error appears in the above-identified patent and that said Letters Patent is hereby corrected as shown below:

On the title page, item (54), in column 1, in "Title", line 3, after "ON" insert -- A --.

On the title page, item (75), in "Inventors", in column 1, line 3, delete "Dave W. Boll" and insert -- David W. Boll --, therefor.

In column 1, line 3, after "ON" insert -- A --.

In column 5, line 26, delete "+45 degrees" and insert -- -45 degrees --, therefor.

Signed and Sealed this

Fifth Day of May, 2009

JOHN DOLL
*Acting Director of the United States Patent and Trademark Office*